United States Patent
Levi et al.

(10) Patent No.: US 10,966,112 B2
(45) Date of Patent: Mar. 30, 2021

(54) METHOD AND SYSTEM FOR DISTRIBUTION OF HIGH DATA THROUGHPUT OVER MULTIPLE WIRELESS CONNECTIONS

(71) Applicant: Ethernity Networks Ltd., Lod (IL)

(72) Inventors: David Levi, Shoham (IL); Shavit Baruch, Kiryat Ono (IL)

(73) Assignee: ETHERNITY NETWORKS LTD., Lod (IL)

( * ) Notice: Subject to any disclaimer, the term of this patent is extended or adjusted under 35 U.S.C. 154(b) by 1551 days.

(21) Appl. No.: 14/166,906

(22) Filed: Jan. 29, 2014

(65) Prior Publication Data

US 2015/0163691 A1 Jun. 11, 2015

Related U.S. Application Data

(60) Provisional application No. 61/912,049, filed on Dec. 5, 2013.

(51) Int. Cl.
*H04W 28/02* (2009.01)
*H04W 40/24* (2009.01)
*H04L 12/707* (2013.01)

(52) U.S. Cl.
CPC ....... *H04W 28/0205* (2013.01); *H04W 40/24* (2013.01); *H04L 45/24* (2013.01)

(58) Field of Classification Search
CPC ....... H04L 47/10; H04L 47/125; H04L 45/00; H04L 45/22; H04L 45/24; H04L 45/245; H04L 45/128; H04L 45/1283; H04L 45/1287
See application file for complete search history.

(56) References Cited

U.S. PATENT DOCUMENTS

| | | | |
|---|---|---|---|
| 7,865,185 B1* | 1/2011 | Satapathy | H04W 88/10 370/310.1 |
| 8,472,475 B2* | 6/2013 | Liu et al. | 370/474 |
| 8,644,339 B1* | 2/2014 | Krishna | H04W 28/065 370/471 |
| 2003/0216141 A1* | 11/2003 | Antoniou et al. | 455/450 |
| 2007/0066239 A1* | 3/2007 | Hart | 455/69 |
| 2009/0088089 A1* | 4/2009 | Chandra et al. | 455/101 |
| 2009/0228575 A1* | 9/2009 | Thubert et al. | 709/220 |
| 2010/0017672 A1* | 1/2010 | Suga | 714/748 |
| 2012/0182880 A1* | 7/2012 | Okada | 370/243 |
| 2013/0064198 A1* | 3/2013 | Krishnaswamy et al. | 370/329 |
| 2013/0195004 A1* | 8/2013 | Hampel | 370/315 |
| 2014/0050087 A1* | 2/2014 | Pasotti et al. | 370/230 |
| 2014/0064249 A1* | 3/2014 | Lee et al. | 370/331 |

* cited by examiner

*Primary Examiner* — Hassan Kizou
*Assistant Examiner* — Hector Reyes
(74) *Attorney, Agent, or Firm* — Reches Patent (57) ABSTRACT

A data distribution system, that includes a source router; destination routers; and a gateway; wherein the source router is arranged to receive multiple data streams and wirelessly transmit the multiple data streams over multiple source router output wireless communication links towards the destination routers; wherein the destination routers are arranged to wirelessly receive the multiple data streams over destination routers input wireless links and to transmit the multiple data streams to the gateway; and wherein the gateway is arranged to reconstruct the multiple data streams and output the multiple data streams over one or more gateway output links.

32 Claims, 11 Drawing Sheets

METHOD AND SYSTEM FOR DISTRIBUTION OF HIGH DATA THROUGHPUT OVER MULTIPLE WIRELESS CONNECTIONS

FIELD OF THE INVENTION

The present invention relates to distribution of high data traffic over multiple wireless links to form ultra high bandwidth wireless backbone.

BACKGROUND OF THE INVENTION

Wireless technology including Wi-Fi, Microwave, Wimax or LTE are used for data transmission and connectivity using Radio Transmission technology for variant of application at the office, Cellular network, Broadband Wireless or Cellular backhaul.

A wide variety of different wireless data technologies exist, some in direct competition with one another, others designed for specific applications. Wireless technologies can be evaluated by a variety of different metrics of which some are described in here.

Cellular networks or WAN are designed for city-wide/national/global coverage areas and seamless mobility from one access point (often defined as a Base Station) to another allowing seamless coverage for very wide areas. Cellular network technologies are often split into 2nd generation, 3G and 4G networks. Originally 2G networks were voice centric or even voice only digital cellular systems (as opposed to the analog 1G networks). Typical 2G standards include GSM and IS-95 with extensions via GPRS, EDGE and 1×RTT, providing Internet access to users of originally voice centric 2G networks. Both EDGE and 1×RTT are 3G standards, as defined by the ITU, but are usually marketed as 2.9G due to their comparatively low speeds and high delays when compared to true 3G technologies.

True 3G systems such as EV-DO, W-CDMA (including HSPA) provide combined circuit switched and packet switched data and voice services from the outset, usually at far better data rates than 2G networks with their extensions. All of these services can be used to provide combined mobile voice access and Internet access at remote locations.

4G networks provide even higher bitrates and many architectural improvements, which are not necessarily visible to the consumer. The current 4G systems that are deployed widely are HSPA+, WIMAX and LTE. The latter two are pure packet based networks without traditional voice circuit capabilities. These networks provide voice services via VoIP.

For wider area communications, Wireless Local Area Network (WLAN) is used. WLANs are often known by their commercial product name Wi-Fi. These systems are used to provide wireless access to other systems on the local network such as other computers, shared printers, and other such devices or even the internet. Typically a WLAN offers much better speeds and delays within the local network than an average consumer's Internet access. WLAN may use in mesh multi-path, multi-hop wireless local area network (WLAN) for outdoor. This wireless mesh network is managed at the layer 3 to meet the connectivity scalability, to enable network connectivity between sites over WLAN mesh networks.

Some systems are designed for point-to-point line-of-sight communications mostly used for wireless broadband services and high data traffic backhaul over proprietary microwave wireless transmission technologies, however these two wireless links are not interoperable with other vendors technologies, once two such nodes get too far apart they can no longer communicate, and may result in frequency congestion in highly populated areas that prevent any throughout scalability in case the microwave line is not sufficient.

An optional solution for higher bandwidth distribution of multiple point to point line may transmit point to point wireless each directed to a different route to prevent congestion and reconstruct the wireless signal back to receiver, that may require careful radio engineering as described in the below diagram.

And a back to back Wi-Fi repeater is used to transmit the wireless signals to the other hand in way that will prevent congestion on the wireless links, as described below The above solution may be sufficient for single transmitter in a certain distribution area, but cannot serve several clients and cannot scale the bandwidth to more than the amount of microwave links that can operate without congestion.

There is a need for plug and play solution that will enable the use off the shelf wireless technology to enable interoperability between vendors, and provide scalable wireless transmission system to support wireless backbone transmission of up to 100 Gbps without the limitation associated with current point to point wireless microwave technologies frequency congestion and with the ability to support the multiple clients.

SUMMARY OF THE PRESENT INVENTION

According to an embodiment of the invention there may be provided a data distribution system may include a source router; destination routers; and a gateway. Wherein the source router may be arranged to receive multiple data streams and wirelessly transmit the multiple data streams over multiple source router output wireless communication links towards the destination routers. Wherein the destination routers may be arranged to wirelessly receive the multiple data streams over destination routers input wireless links and to transmit the multiple data streams to the gateway. Wherein the gateway may be arranged to reconstruct the multiple data streams and output the multiple data streams over one or more gateway output links.

The source router may be arranged to wirelessly transmit different data streams over different source router output wireless communication links.

The source router may be arranged to wirelessly transmit different fragments of a data stream or flow of the multiple data streams over different source router output wireless communication links; and wherein the gateway may be arranged to reconstruct the data stream from the fragments of the data stream.

The gateway may be arranged to detect missing fragments of the data stream and to request a re-transmission of at least the missing fragments data stream.

The fragments of the data stream may be fragments of frames of the data streams.

The data distribution system may include a group of intermediate routers wherein the group may be arranged to receive the fragments of frames of the data stream and to wirelessly transmit the fragments of the frames of the data streams to the destination routers without reconstructing the frames of the data stream.

The source router output wireless communication links may be wireless local area network (WLAN) links.

The source router output wireless communication links may be point to point wireless links.

The destination routers may be arranged to transmit the multiple data streams to the gateway over wired destination routers links.

The destination routers and the gateway may be coupled to each other to form a communication ring.

The data distribution system may include a group of intermediate routers wherein the group may be arranged to receive the multiple data streams from the multiple source router output wireless communication links and to wirelessly transmit the multiple data streams over the destination routers input wireless links.

The group of intermediate routers may include a first layer of intermediate routers that may be arranged to receive the multiple data streams from the multiple source router output wireless communication links and a last layer of intermediate routers that may be arranged to wirelessly transmit the multiple data streams over the destination routers input wireless links; wherein the first and layers of intermediate routers are wirelessly coupled to each other.

The group of intermediate routers further may include an intermediate layer of intermediate routers wirelessly coupled between the first and last layers of intermediate routers.

The gateway may be arranged to evaluate wireless path parameters of various wireless paths formed between the source router and the destination routers.

The source router may be arranged to add metadata relating to wireless path parameters of various wireless paths formed between the source router and the destination routers.

The multiple data streams may include multiple Ethernet frames.

According to an embodiment of the invention there may be provided a method for data distribution the method may includes receiving by a source router multiple data streams; wirelessly transmitting the multiple data streams over multiple source router output wireless communication links towards destination routers; wirelessly receiving by the destination routers the multiple data streams over destination routers input wireless links; transmitting by the destination routers the multiple data streams to the gateway; reconstructing by the gateway the multiple data streams; and outputting by the gateway the multiple data streams over one or more gateway output links.

The method may include wirelessly transmitting by the source router different data streams over different source router output wireless communication links.

The method may include wirelessly transmitting by the source router different fragments of a data stream of the multiple data streams over different source router output wireless communication links; and reconstructing by a gateway the data stream from the fragments of the data stream.

The method may include detecting by the gateway missing fragments of the data stream requesting a re-transmission of at least the missing fragments of the data stream.

The fragments of the data stream may be fragments of frames of the data streams.

The method may include receiving the fragments of frames of the data stream by a group of intermediate routers and wirelessly transmitting the fragments of the frames of the data streams to the destination routers without reconstructing the frames of the data stream by the group of intermediate routers.

The source router output wireless communication links may be wireless local area network (WLAN) links.

The source router output wireless communication links may be point to point wireless links.

The transmitting of the multiple data streams to the gateway is executed over wired destination routers links coupled between the destination routers and the gateway.

The destination routers and the gateway may be coupled to each other to form a communication ring.

The method may include receiving by a group of intermediate routers the multiple data streams from the multiple source router output wireless communication links; and wirelessly transmitting by the group of intermediate routers the multiple data streams over the destination routers input wireless links.

The group of intermediate routers may include a first layer of intermediate routers and a last layer of intermediate routers wherein the method may include wirelessly receiving by the first layer of intermediate routers the multiple data streams from the multiple source router output wireless communication links and wirelessly transmitting by the last layer of intermediate routers the multiple data streams over the destination routers input wireless links; wherein the first and layers of intermediate routers are wirelessly coupled to each other.

The method may include wirelessly receiving from the first layer of intermediate routers and by an intermediate layer of intermediate routers the multiple data streams and wirelessly transmitting the multiple data streams from the intermediate layer of intermediate routers and to the destination routers the multiple data streams.

The method may include evaluating by the gateway wireless path parameters of various wireless paths formed between the source router and the destination routers.

The method may include adding by the source router metadata relating to wireless path parameters of various wireless paths formed between the source router and the destination routers.

The multiple data streams may include multiple Ethernet frames.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

The term "server" may have its regular meaning and may refer to a device that is capable of routing data between one or more input port and one or more output port and that is capable of transmitting (wirelessly or in a wired manner) the data from its one or more output ports in wireless or wired manner.

For a certain data stream a "source destination" is a first router of a system that that receives the certain data stream and wirelessly transmits the certain data stream to one or more other routers.

A destination router is a server or communication hardware that receives a certain data stream and sends it (directly or via one or more other destination routers) to a gateway.

According to various embodiments of the invention there is provided a virtual high bandwidth wireless backbone that includes data transmission and receiving units (destination routers and source router) to generate a multiplicity of data streams from several incoming data stream over multiple point to point wireless connections (that may be running on the same frequency), and a single central receiver (source server) and transmitter system (includes the source server, intermediate servers, destination servers and gateway) that aggregates data streams from multiple point to point wireless connections and from multiple incoming data stream originators to a single ultra-bandwidth link There is provided, in accordance with a preferred embodiment of the present invention a topology that may use off the shelf Wi-Fi links (eve of the same frequency) that will form, a customer premises multi gigabit transmission system that distributes data traffic fragment over multiple Ethernet port including Fast Ethernet and Gigabit Ethernet. Each Ethernet port (Fast or Giga) receive data fragments and is connected to Wi-Fi link that is directed to transmit wireless signals towards such direction that will prevent congestion between the subsequent wireless links running the same frequency as described in the below diagram.

Figure 10:
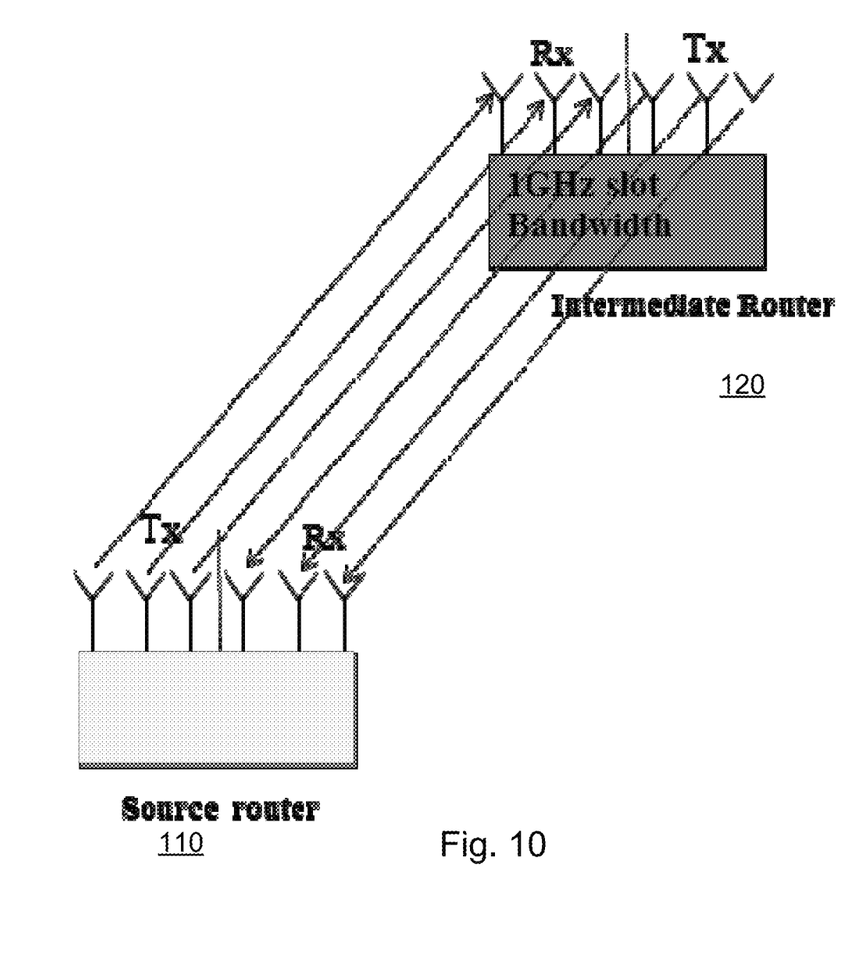
FIG. 10 illustrates wireless transmissions between source and intermediate routers according to an embodiment of the invention.

Another potential topology may include connectivity of multiple wireless links operation at different sub wavelength to form hub and spoke connectivity in an environment that cannot accommodate mesh topology, as illustrated in FIG. 10.

FIG. 10 illustrates wireless transmissions between source and intermediate routers 110 and 120, each equipped with multiple receive and transmit antennas according to an embodiment of the invention. The reference to 1 Ghz slot is only an example and solution with same frequency is also application even at higher noise, sue to the ability to perform retransmission on a per fragment basis For increased bandwidth and availability of communication channels between nodes (e.g., switches and stations), link aggregation or trunking is a method of grouping physical network links into a single logical link, i.e., a single transport channel (according to IEEE standard 802.3ad). With link aggregation, it is possible to increase capacity of communication channels between nodes using their Fast Ethernet and Gigabit Ethernet technology. Two or more Gigabit Ethernet connections can be grouped to increase bandwidth, and to create resilient and redundant links. Standard local area network (LAN) technology provides data rates of 10 Mbps, 100 Mbps and 1000 Mbps and, for obtaining higher capacity (e.g., 10000 Mbps) link aggregation allows grouping of 10 links; and where factors often (10) are excessive, link aggregation can provide intermediate rates by grouping links with different rates. Layer-2 link aggregation can be used in various types of data communications, including transport channel, Ethernet port and the like. Layer-2 link aggregation uses special patterns or features of data traffic. Examples of such patterns are destination and source addresses such as MAC and IP addresses (MAC—media access control). These patterns can make traffic load balancing difficult to handle in layer-2 link aggregation operations, therefore making it desirable to have a better load balancing scheme.

All prior arts for building a trunk consisting of several lower speed links such as Ling aggregation (LAG) based on IEEE standard 802.3ad, cannot distribute the data in a uniform method between the different links, since even if the mapping of data flows to ports is uniform based on the LAG distribution algorithm, underutilization of a bundle can occur. For example, consider the situation in which two packet flows include 10,000 data packets and 10 other packet flows each include 100 packets, all packets of the same size. If there are three communication links in the bundle, then the fixed-mapping process is likely to send four packet flows to each of the three ports connected to corresponding communication links in the bundle. Two of the three ports might carry 10,300 data packets, the third will carry 400 data packets. The first two ports might become overused even while the third port is underused, leading to a reduction in the rate at which the 10,300 data packets are sent over the first and second communication links. The bundle as a whole performs at a rate less than its advertised capability, and when considering Wireless links we would like to send on each link same amount of traffic in percentage related to the maximum throughput of the wireless link.

Furthermore, prior art based on LAG cannot transmit flow that exceed the throughput of one of the links of the trank. For Example, consider we would like to build a trunk of single Gbps consisting of 10 100 Mbps links (FE), so in this case with LAG we will not be able to transmit a flow of 200 Mbps, since inherently the LAG control can transmit a flow to a single port, and cannot send same flow over two different ports, and obviously same is applicable for multiple wireless links. Where each link may be able to transmit different throughput.

In order to distribute data packets from the same packet flow on different communication links of a bundle. A major problem arises if there is a need to transmit same flow on different communication link of a bundle, because variable delays are experienced on every communication link, caused for example by congestion, noise and errors. If successive data packets from the same flow are placed on different links, the later packet might experience a smaller delay than the earlier packet and arrive at the destination node out of order. Out-of-order data packets create problems for the receiving node. For example, in some protocols, out-of-order data packets cause a receiving node to determine that there is missing data, and the receiving node may add to congestion on the link by sending requests on the link to resend several data packets and then receiving the resent data packets on that link. In some protocols, out of order packets are simply discarded.

The present invention intends to send the same flow over different communication link of a bundle and handle all the issues arise from out of order, different delay, and in order to enable the flow to run on different routes the solution perform new packet with IP address and MAC address to enable to route the packet through regular intermediate routers up to the gateway that will construct the packet.

Sending fragment will enable to perform retransmit only for a certain 128 B fragment versus retransmission of a large frame of up to 9600 B.

In accordance with this invention state of the art as described above need to use wireless repeater to direct the wireless signals to the other end, where according to the present invention Wi-Fi hotspot will collect the data fragments and will distribute them over Ethernet over any media including DSL, cable or Fiber point to point/point to multi point or ring as described in the diagram below.

In accordance with the present invention the data fragment that will run on the Ethernet (between the source server to the destination servers—with or without intermediate servers) a need to maintain the packet order, hence the Wi-Fi hotspot will be very simple low cost hotspot, and only the received system at the far end will perform the frame reordering to enable the packet reconstruction. FIGS. 1-6 illustrate destination servers 140 and gateway 150 that are arranged in a ring and—the gateway 150 receives from the destination routers all the Ethernet fragments and aggregates them into a single data stream—thereby reconstructing the data stream provided (via link 10) to the source router 110.

Figure 1:
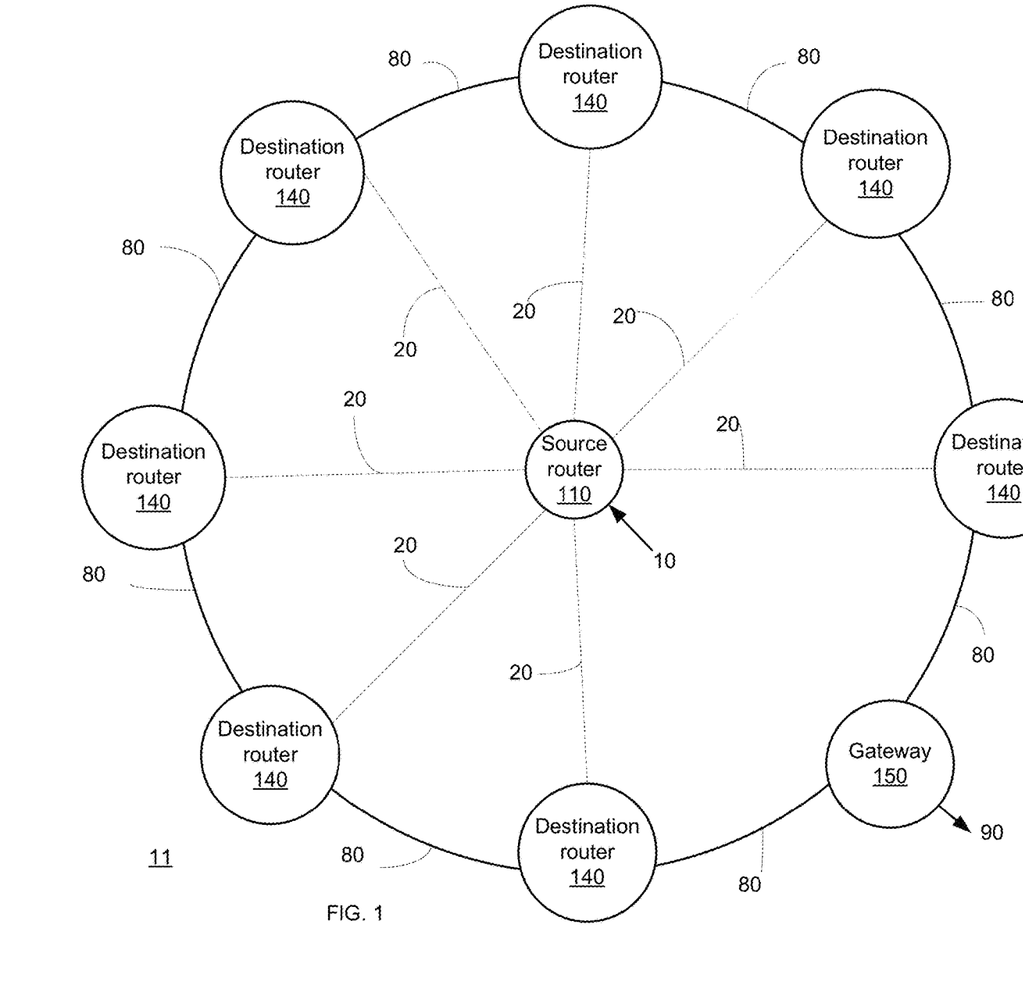
FIG. 1 illustrates a system according to an embodiment of the invention.

FIG. 1 illustrates a system 11 that includes seven destination routers 140 and a gateway 150 that are coupled in a ring formation and a single source router 110 that is coupled via Wi-Fi links 20 to the destination routers 140. The destination routers and the gateway 150 are coupled via links 80 that may be wireless or wired links.

Figure 2:
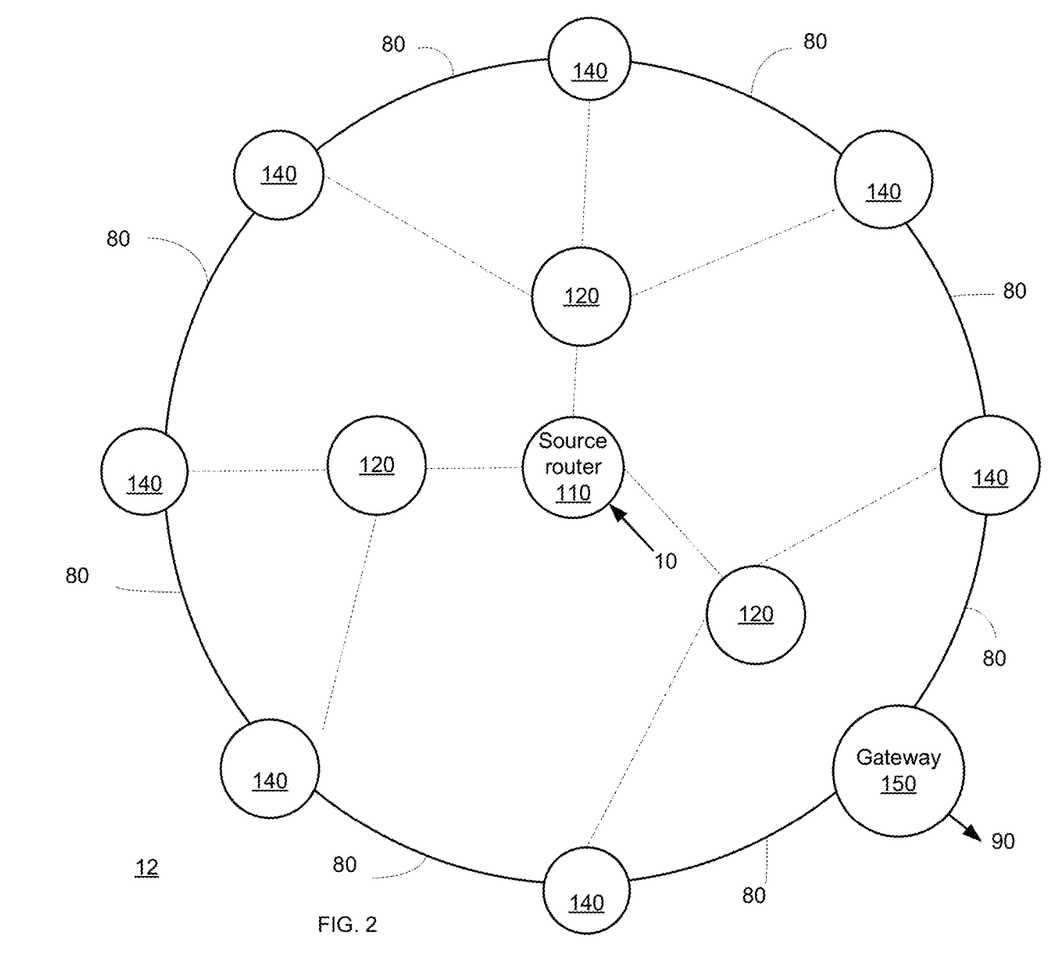
FIG. 2 illustrates a system according to an embodiment of the invention.

FIG. 2 illustrates a system 12 that includes seven destination routers 140 and a gateway 150 that are coupled in a ring formation, a single source router 110 and three intermediate routers 120 that form a group of intermediate routers of a single layer. The source router 110 is coupled via Wi-Fi links to the intermediate routers 120 that are coupled via Wi-Fi links to the destination routers 140. The destination routers and the gateway 150 are coupled via links 80 that may be wireless or wired links.

Figure 3:
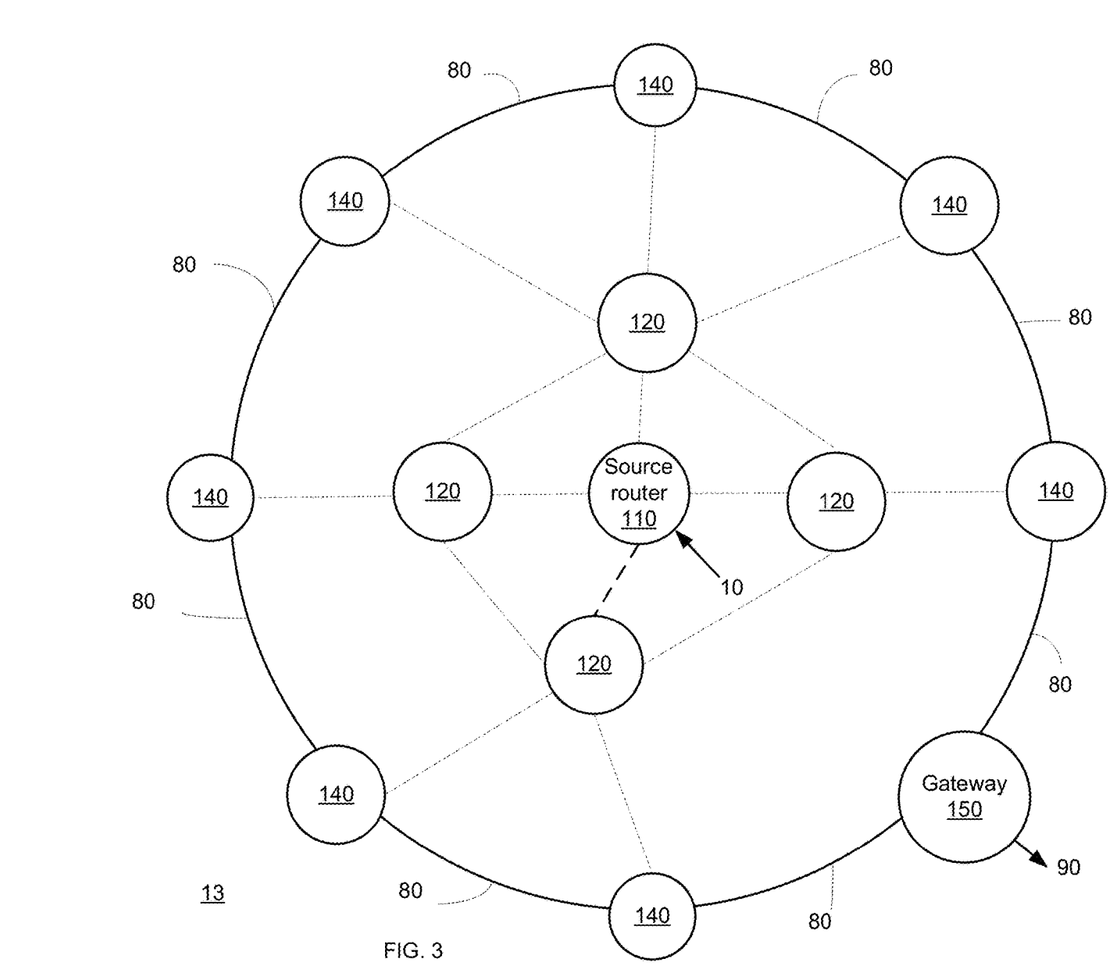
FIG. 3 illustrates a system according to an embodiment of the invention.

FIG. 3 illustrates a system 13 that includes seven destination routers 140 and a gateway 150 that are coupled in a ring formation, a single source router 110 and four intermediate routers 120 that form a group of intermediate routers of a single layer. The source router 110 is coupled via Wi-Fi links to the intermediate routers 120 that are coupled via Wi-Fi links to the destination routers 140. The destination routers and the gateway 150 are coupled via links 80 that may be wireless or wired links. The four intermediate routers 120 are also coupled to each other via Wi-Fi links.

Figure 4:
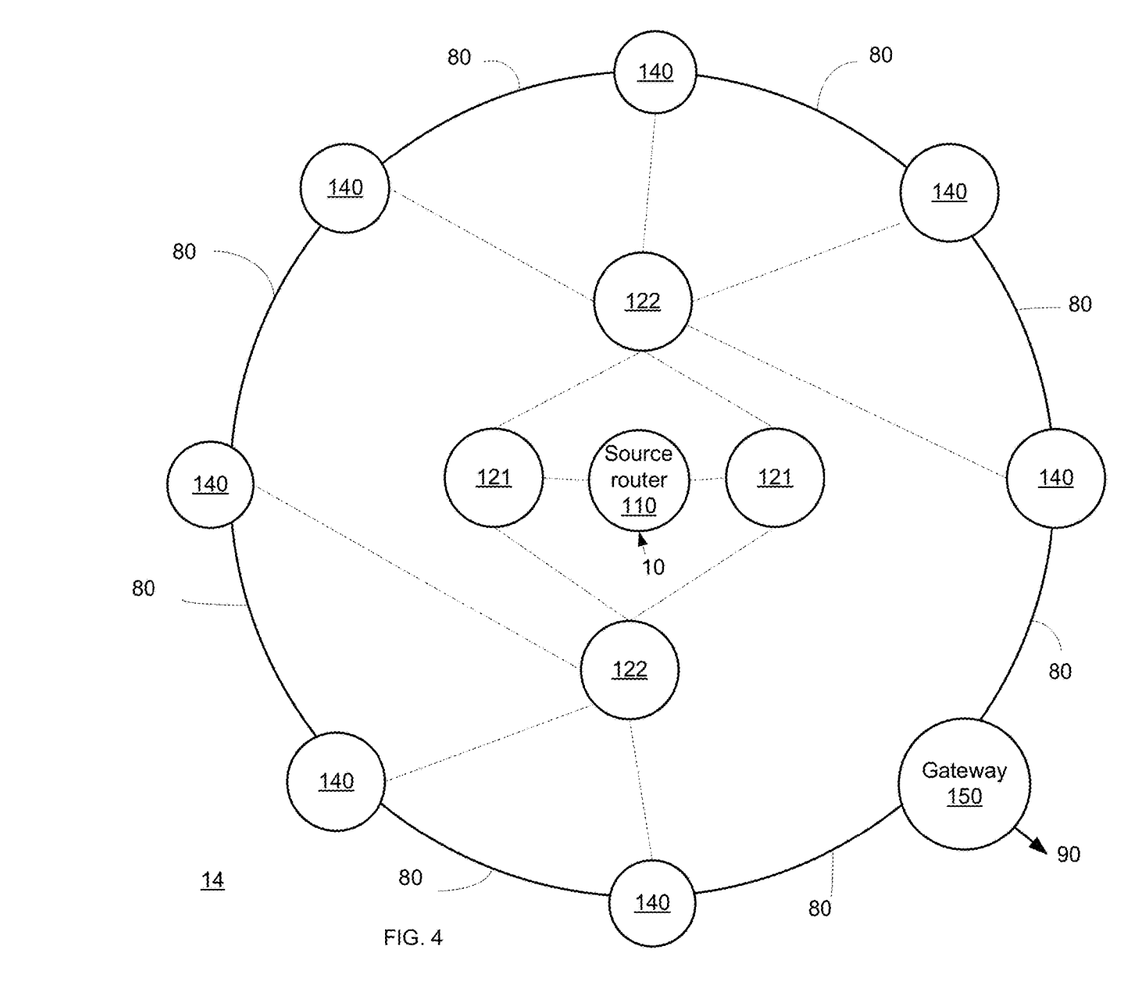
FIG. 4 illustrates a system according to an embodiment of the invention.

FIG. 4 illustrates a system 14 that includes seven destination routers 140 and a gateway 150 that are coupled in a ring formation, a single source router 110 and four intermediate routers that form a group of intermediate routers of a first and last layers. The source router 110 is coupled via Wi-Fi links to the intermediate routers 121 of the first layer that are coupled via Wi-Fi links to the intermediate layers of the last layer 122 that are coupled via Wi-Fi links to the destination routers 140. The destination routers and the gateway 150 are coupled via links 80 that may be wireless or wired links.

Figure 5:
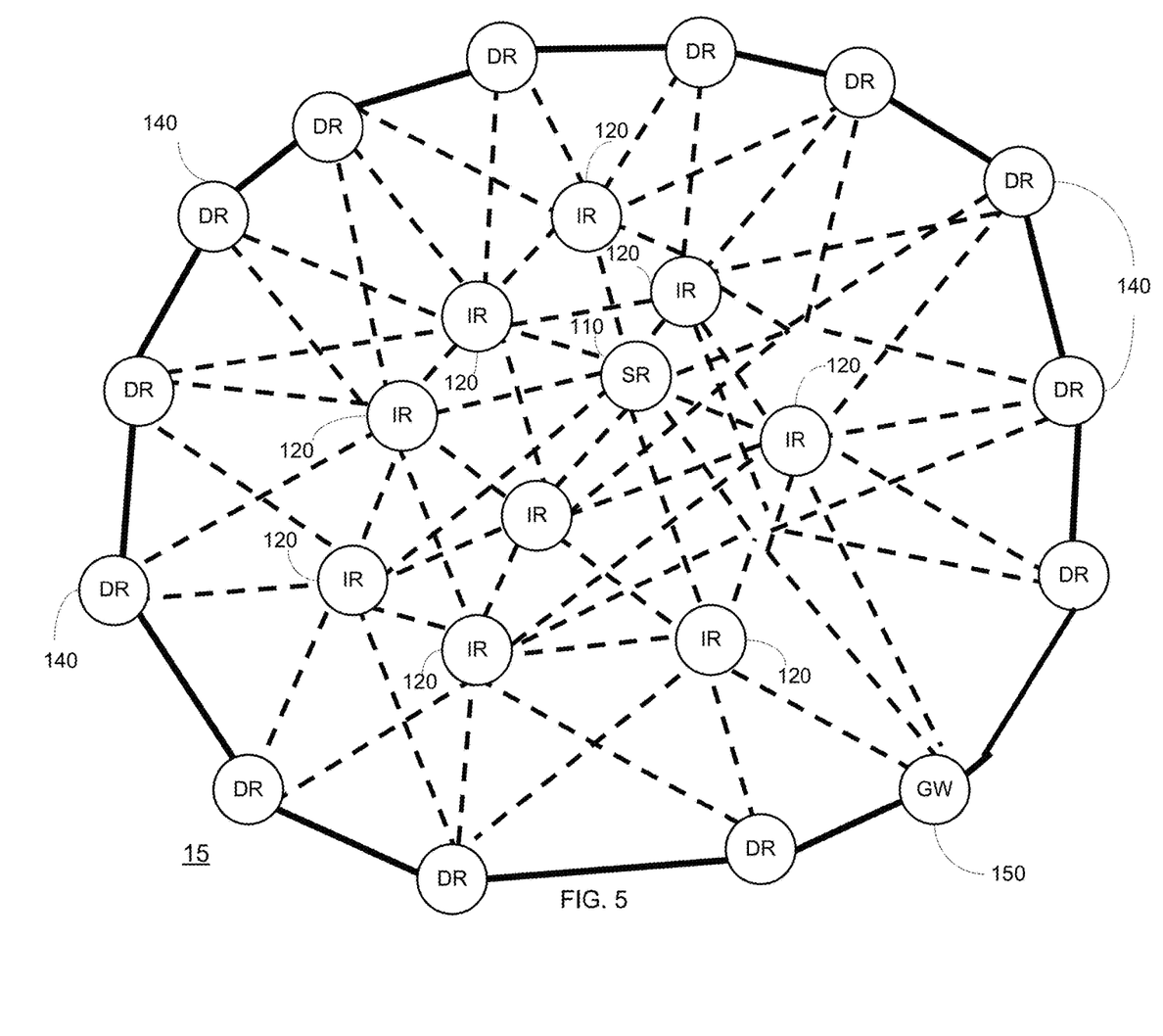
FIG. 5 illustrates a system according to an embodiment of the invention.

FIG. 5 illustrates a system 15 that includes thirteen destination routers (DR) 140 and a gateway (GW) 150 that are coupled in a ring formation, a single source router (SR) 110 and a group of eight intermediate routers (IR) 120 that form a group of intermediate routers. The destination routers 140, the single source router SR 110 and the group of eight intermediate routers are wirelessly coupled to each other via Wi-Fi links. This figure illustrates that a single destination router 140 can be coupled via Wi-Fi links to multiple intermediate routers 120, that each intermediate router 120 can be coupled via Wi-Fi links to multiple other intermediate routers 120.

Figure 6:
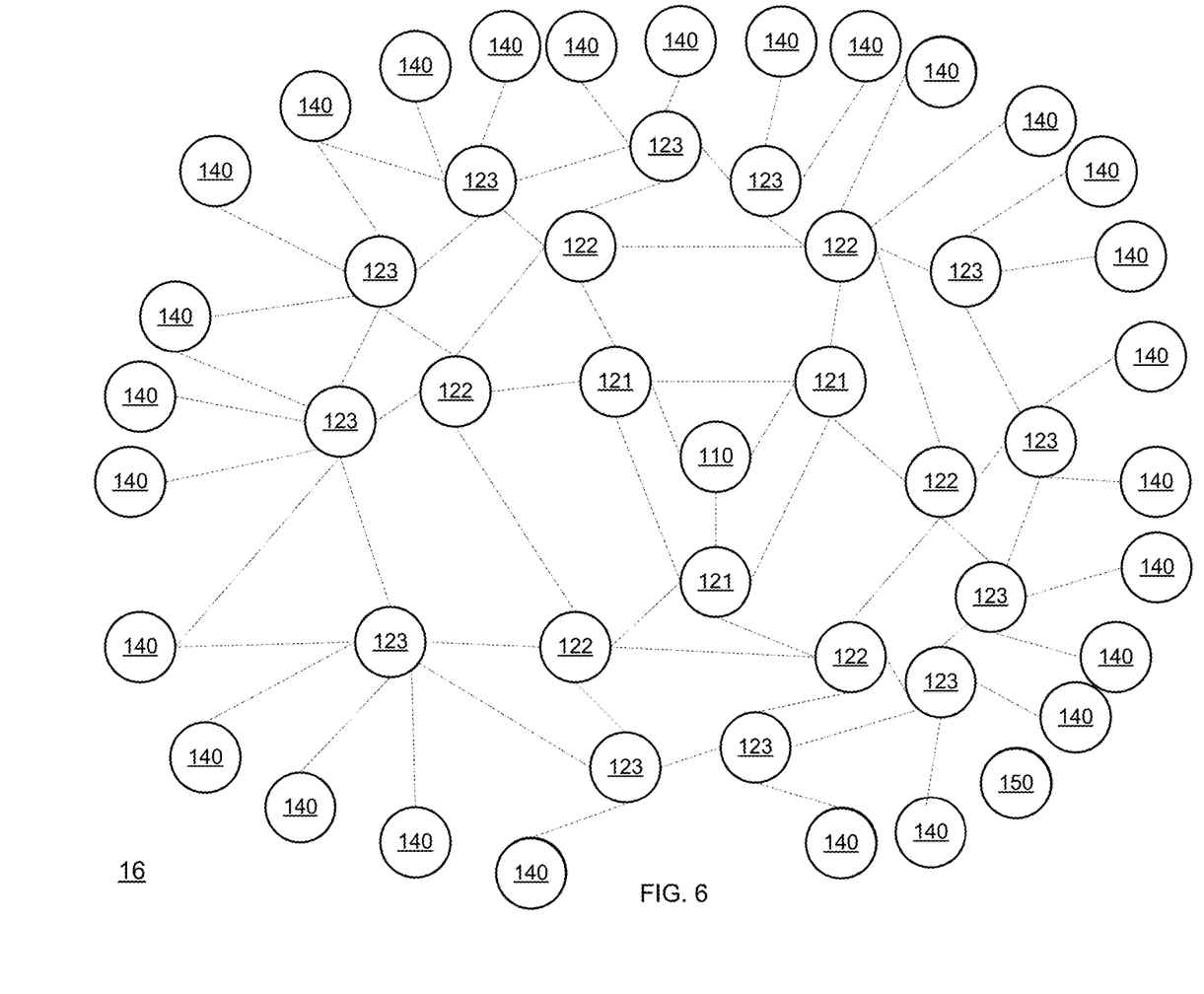
FIG. 6 illustrates a system according to an embodiment of the invention.

FIG. 6 illustrates a system 16 that includes twenty seven destination routers (DR) 140 and a gateway (GW) 150 that are coupled in a ring formation, a single source router (SR) 110 and a group of twenty eight intermediate routers that form a group of intermediate routers of three layers—intermediate router of a first layer 121, intermediate router of a second layer 122 and intermediate router of a third layer (last layer) 12. The destination routers 140, the single source router SR 110 and the group of intermediate routers are wirelessly coupled to each other via Wi-Fi links.

The source router 110 is coupled via Wi-Fi links to the intermediate router of a first layer 121 that are coupled via Wi-Fi links to the intermediate router of a second layer 122 that are coupled via Wi-Fi links to the intermediate router of a third layer 123 that are coupled via Wi-Fi links to the destination routers 140. This figure illustrates that a single destination router 140 can be coupled via Wi-Fi links to multiple intermediate routers 120, that each intermediate router 120 can be coupled via Wi-Fi links to multiple other intermediate routers 120.

Figure 7:
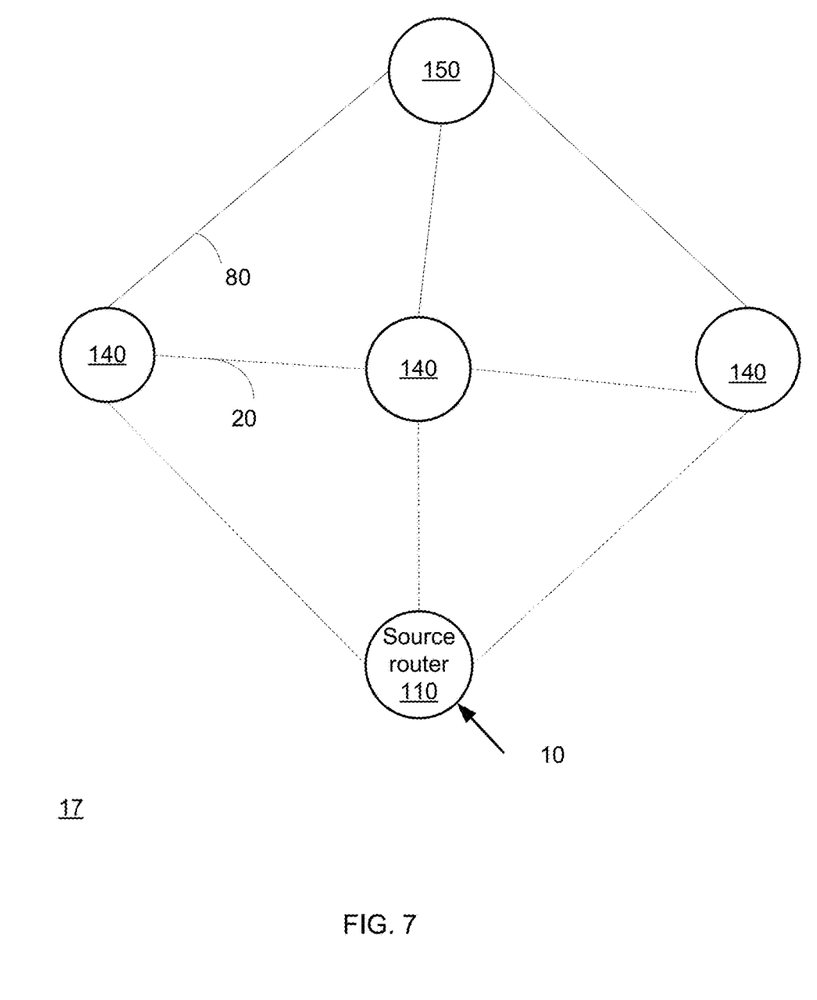
FIG. 7 illustrates a system according to an embodiment of the invention.

FIG. 7 illustrates a system 17 without any intermediate server—three destination routers 140 are coupled between gateway 150 and source router 110. The source router 110 is coupled via Wi-Fi links 20 to the destination routers 140. The destination routers and the gateway 150 are coupled via links 80 that may be wireless or wired links.

Figure 8:
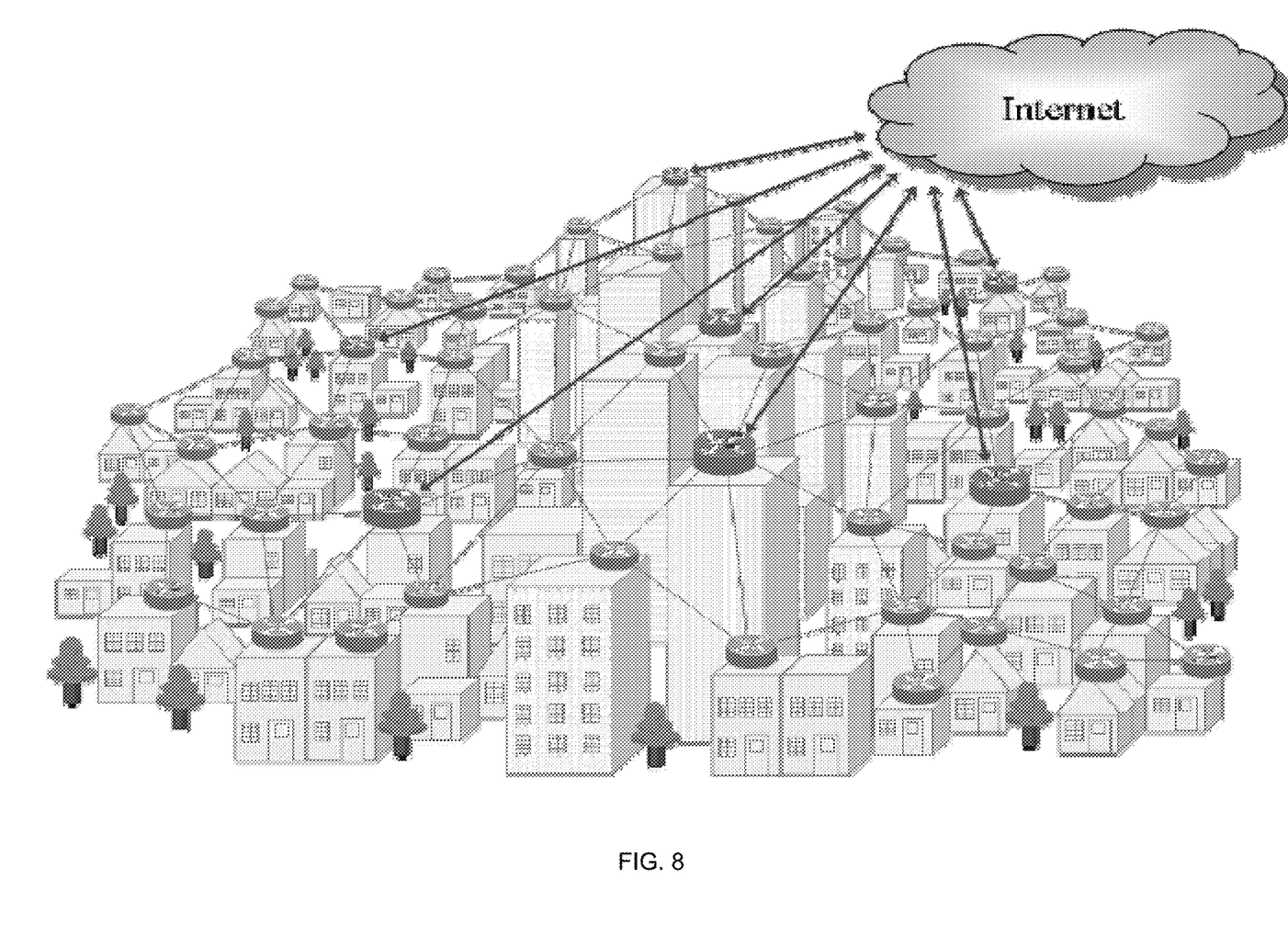
FIG. 8 illustrates a system according to an embodiment of the invention.
Figure 9:
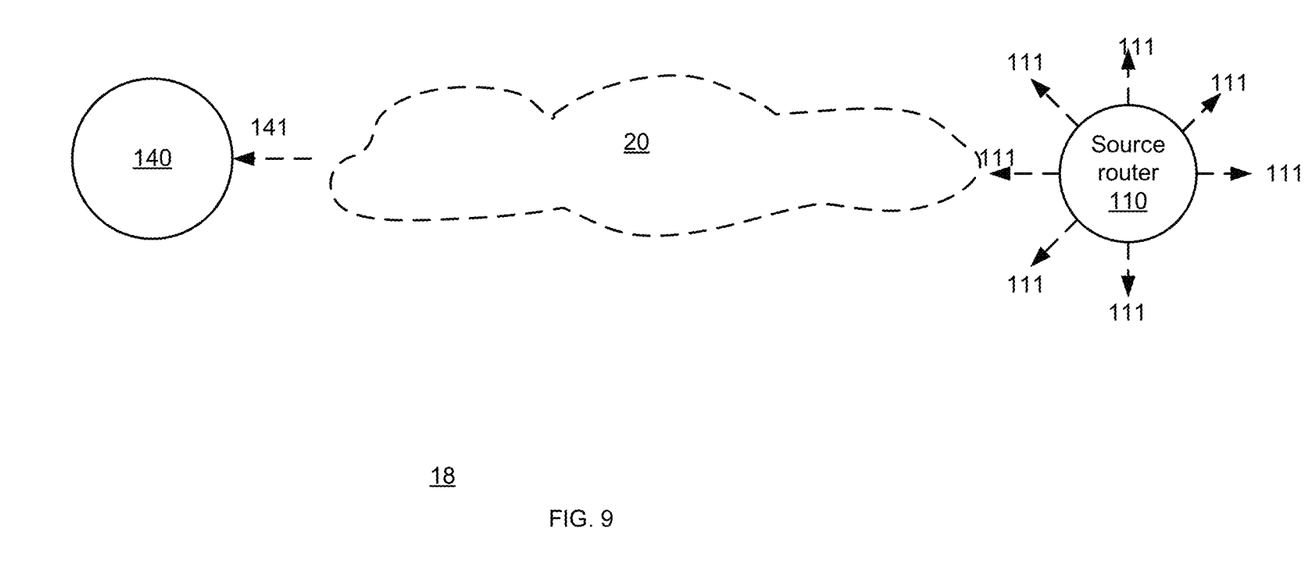
FIG. 9 illustrates a portion of a system according to an embodiment of the invention.

FIG. 8 illustrates a system 18 that is installed in an urban area on top of buildings to cover entire area through the use of this invention and includes multiple source routers and intermediate routers (BLUE) connected directly to Gateway (RED) and each gateway is connected in Star topology towards an internet router in a native Ethernet format. In this FIG. 8, we do not use a previous ring topology, but install several gateways within the network to offer different network topology other than the previous topologies that included the destination routers connected in a ring topology towards single gateway that in certain topologies cannot be implemented FIG. 9 illustrates a source router 110 that includes multiple source router output wireless communication links 111 and a destination router 140 that has a destination routers input wireless link 141.

Some of the mentioned above figures (for example—FIGS. 2-7) illustrate a star topology of the Wi-Fi distribution that is a scalable wireless backbone that can scale to as much as 32 Wi-Fi links (depend on frequency budget and distance) running the same frequency that may potentially deliver a wireless backbone of 100 Gbps.

FIG. 7 illustrates a simpler topology may use 3 Wi-Fi link for lower throughput requirements as described in the below diagram.

In FIGS. 1-9 there was shown a single router however this architecture may support multiple routers that may transmit over the same frequency in a shared topology using the nature Wi-Fi shared media capabilities.

A common solution to transmit higher throughput on multiple lower throughput links is LAG (link aggregation), but again a single IP stream can be transmitted on a single wireless link, since otherwise, it will result with packet reorder.

Any of the mentioned above systems 11-17 may offer unique packet transmission technology for carrier grade scalable 10G mesh wireless backbone in point to point and mesh network offering the use of off the shelf wireless technology with maximum availability and scalability.

This provides a scalable solution that can use off the shelf Wi-Fi technology running the same frequency that will result with dramatic CAPEX and OPEX reduction.

Any of the mentioned above systems may runs packets or single IP stream over multiple links with the ability to transmit those packets over standard switches and construct the data to a single stream using packet reordering technology and jitter buffer.

Furthermore—this system may result with maximum service availability, since in the case of wireless link or area failure, the data stream was not lost and only suffer from certain bandwidth reduction, versus other mesh solution that will need to use routing protocols to reroute the traffic over other connection/links.

The above systems 11-17 may utilize point to point Wi-Fi links and may evolve to connect multiple points in a mesh topology, such that a single gateway device constructs original data stream coming from multiple sources.

Each router of destination router 140, source router 100 and intermediate routers 120, 121, 122 and 123 may include carrier Ethernet features such as QoS, OAM and CFM.

The source router 110 may transmit data originated from local data transmission such as Ethernet port or Wi-Fi, together with the ability to transmit traffic originated at different router being part of the mesh network.

The source router 110 may be arranged to cut the original Ethernet traffic coming from the local 1/10Gbps to small IP fragments or Ethernet fragment or any other form of standard fragment and will distribute the fragments over multiple microwave (wireless) links. The router will include load balancing mechanism such that it will transmit the fragments according to the relative load on each wireless link, that will enable maximum utilization of available wireless resources. Noted that the router can also transmit part of the traffic over wired connections, and use the wireless as a backup.

Each router (110, 120-123 and 140) may include routing/switching and traffic management function to enable switching of fragments over the networks up to a gateway that will construct the original data stream, or towards the local Ethernet or Wi-Fi ports.

The gateway 150 may support cluster of multiple routers that routes streams towards the right router, and collects fragments of packets from multiple routers to form the original stream Each router (110, 120-123 and 140) may include hierarchical traffic management to enable the control of specific service/flow over the wireless link, such that if certain flow that pass through the wireless was not effect failure in other location on the network, then this flow will continue to transmit traffic over the local wireless link, and only the specific flow that effect link failure on a remote link will stop transmit over that specific link and the related fragments will be transmitted over the other links in the trunk group.

The gateway 150 supports cluster of multiple routers that routes streams towards the right router, and collects fragments of packets from multiple routers to form the original stream.

The gateway 150 will connect towards the wired network with Ethernet interface and will construct a virtual port for each router in the network.

Gateway 150 receive data from a certain port and transmit the data fragment over the Ethernet ports that are attached to certain Wi-Fi over point to point Ethernet link or towards the ring and assigns Wi-Fi destination ID, router destination ID address and fragment ID for each fragment.

When certain Wi-Fi received fragment assigned to him the Wi-Fi transmit the traffic towards the right router as indicated in the data fragment.

The Gateway 150 receives on dual Ethernet port (in case of ring) or from multiple Ethernet ports the fragments originated at the routers and construct Ethernet frame for transmission based on L2/L3/L4 information. Noted that the gateway 150 can also perform as the edge router and can perform local switching between different routers on the same wireless backbone network The gateway 150 may include 4 queues hierarchies to include another queue hierarchy for each router in the network.

The system of FIGS. 2-9 may be arranged to provide:
a. 10 Gbps/100 Gbps wireless virtual connection—delivers packet transmission over multiple wireless links through maximum network availability while maintaining end to end network delay on flow by flow bases.
b. Scalable throughput—the system offers multi point to point scalable wireless network through the ability to connect as many Wi-Fi links per virtual connection together with single gateway to construct the original streams coming from multiple routes c. Maximum availability—supports scalable and maximum mesh network availability without the need to reroute the entire traffic in case of link failure. A certain link or area failure only decreases momentarily the throughout d. Lossless—Equipped with 50 ms buffering to enable retransmission in cased of failure in one of the links.

e. Fiber Less to The Home—Fiber to the curve with directional wireless to home.

f. Sourcing standard Wi-Fi—Use standard Wi-Fi technology without the need to cope with high operational cost of proprietary microwave technology.

g. Data offload—Offers Wi-Fi offload and data traffic conversion to standard Carrier Ethernet network Any of the mentioned above systems may offer maximum network availability, so in case of wireless link failure in the network, the solution will enable to maintain the service and will only result momentarily bandwidth reduction, since single stream is transmitted over several wireless links, such that in case of failure or massive noise on one of the links the algorithm will transmit the relative data over the other operational links or will decrease the total throughput of the data stream. The distribution of the fragment of a single stream will be allocated to a link (one of the wireless links) according to the available throughput of that specific link, so essentially the solution offer native load balancing as a result of the network congestion.

The above description is related to local link failure management, but the solution enables to manage failure on a global mesh network, so on a failure occurrence on one of the wireless link over a mesh network, the router that will identify local failure will transmit in band message to all flows/streams on a per flow/service basis that certain link in the network failed and fragment of the specific flow that pass through this link may drop. as soon as such message will arrive to a certain router the router will stop the transmission fragments of the specific flow on the original link and will distribute the flow over the other wireless link begin part of a group, or will decrease the throughput of the specific link if the other available links will not be able to accommodate the original throughput.

In the transmit direction from a source router, data is segmented into small data fragments each with dedicated Identification Number (ID) where each fragment may be transmitted over different Wi-Fi link. Each router represents group that at the far end the Gateway 150 will construct to regular Ethernet stream that may enable to support different router by allocating bonding group per router.

The Gateway 150 receives on dual Ethernet port (in case of ring) or from multiple Ethernet ports the fragments originated at the routers and construct Ethernet frame for transmission based on L2/L3/L4 information. Noted that the gateway 150 can also perform as the edge router and can perform local switching between different routers on the same wireless backbone network The gateway 150 receives the data fragments from several Wi-Fi hotspots and construct the packet.

From Gateway 150 to Router (All Routers)

Gateway 150 receive data from a certain port and transmit the data fragment over the Ethernet ports that are attached to certain Wi-Fi over point to point Ethernet link or towards the ring and assigns Wi-Fi destination ID, router destination ID address and fragment ID for each fragment. When certain Wi-Fi received fragment assigned to him the Wi-Fi transmit the traffic towards the right router as indicated in the data fragment.

Another use of the receiver gateway is to serve as a central bonding de-bonding equipment for wired links to enable implementation of a central processing unit that can serve multiple groups and multiple links without a need to perform ingress buffer at the link level for handling of fragment reassembly.

Figure 11:
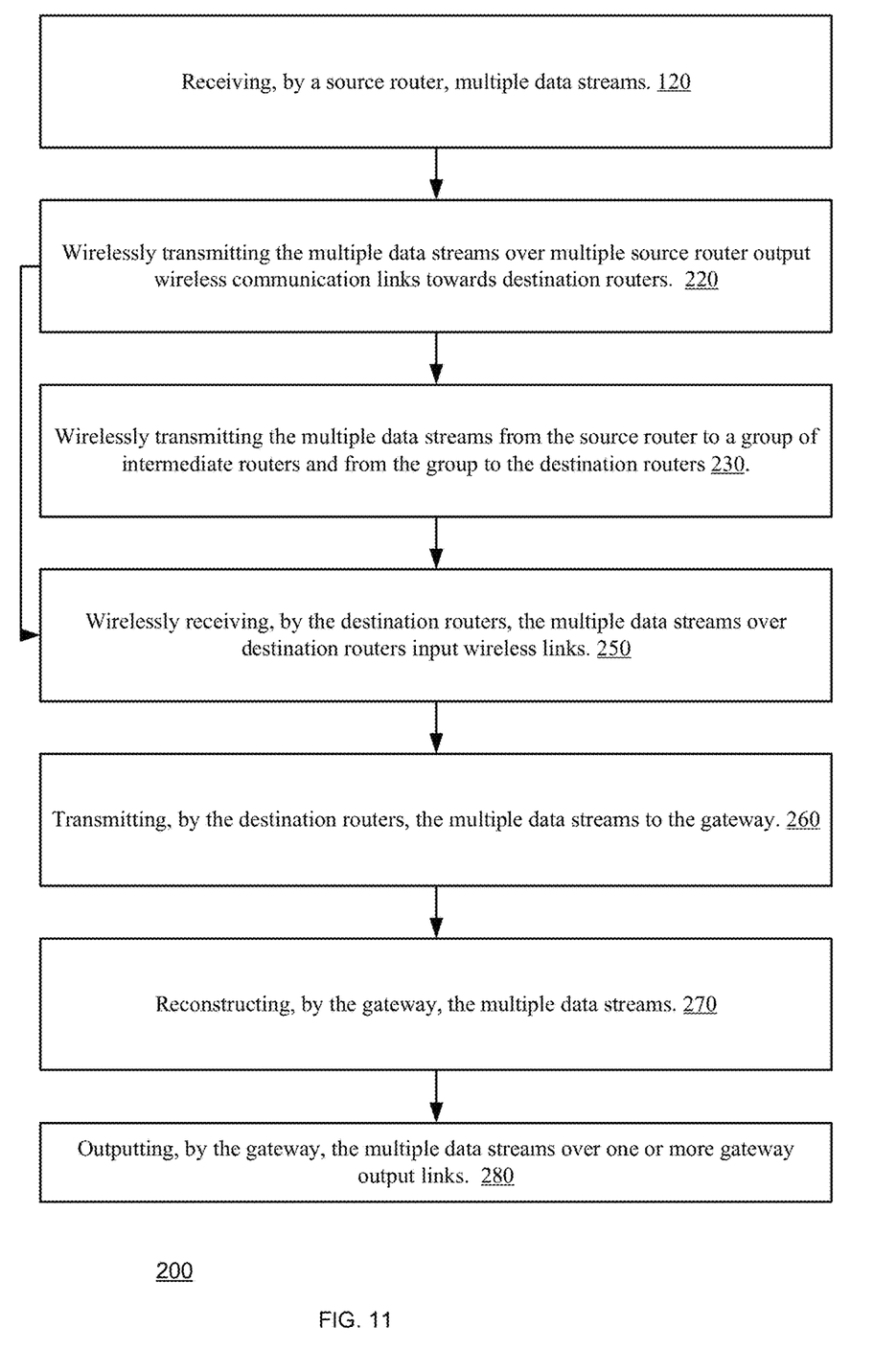
FIG. 11 illustrates a method according to an embodiment of the invention.

FIG. 11 illustrates method 700 according to an embodiment of the invention.

Method 200 includes the following stages:

a. Receiving, by a source router, multiple data streams 110.

b. Wirelessly transmitting the multiple data streams over multiple source router output wireless communication links towards destination routers 220.

c. Wirelessly transmitting the multiple data streams from the source router to a group of intermediate routers and from the group to the destination routers 230.

d. Wirelessly receiving, by the destination routers, the multiple data streams over destination routers input wireless links 250.

e. Transmitting, by the destination routers, the multiple data streams to the gateway 260.

f. Reconstructing, by the gateway, the multiple data streams 270.

g. Outputting, by the gateway, the multiple data streams over one or more gateway output links 280.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A data distribution system, comprising:
   a source router;
   destination routers; and
   a gateway;
   wherein the source router is arranged to receive multiple data streams and wirelessly transmit the multiple data streams over multiple source router output wireless communication links towards the destination routers; wherein the destination routers are arranged to wirelessly receive the multiple data streams over destination routers input wireless links and to transmit the multiple data streams to the gateway;
   wherein each destination router is configured to receive at least a fragment of a data stream and to send the at least fragment of the data stream, directly or via one or more other destination routers, to the gateway; and
   wherein the gateway is arranged to reconstruct the multiple data streams and output from the data distribution system the multiple data streams over one or more gateway output links.

2. The data distribution system according to claim 1 wherein the source router is arranged to wirelessly transmit different data streams over different source router output wireless communication links.

3. The data distribution system according to claim 1 wherein the source router is arranged to wirelessly transmit different fragments of a data stream of the multiple data streams over different source router output wireless communication links; and wherein the gateway is arranged to reconstruct the data stream from the fragments of the data stream.

4. The data distribution system according to claim 3 wherein the gateway is arranged to detect missing fragments of the data stream and to request a retransmission of at least the missing fragments data stream.

5. The data distribution system according to claim 3 wherein the fragments of the data stream are fragments of frames of the data streams.

6. The data distribution system according to claim 5 further comprising a group of intermediate routers, wherein the group is arranged to receive the fragments of frames of the data stream and to wirelessly transmit the fragments of the frames of the data streams to the destination routers without reconstructing the frames of the data stream.

7. The data distribution system according to claim 1 wherein the source router output wireless communication links are wireless local area network (WLAN) links.

8. The data distribution system according to claim 1 wherein the source router output wireless communication links are point to point wireless links.

9. The data distribution system according to claim 1 wherein the destination routers are arranged to transmit the multiple data streams to the gateway over wired destination routers links.

10. The data distribution system according to claim 1 wherein the destination routers and the gateway are coupled to each other to form a communication ring.

11. The data distribution system according to claim 1 further comprising a group of intermediate routers, wherein the group is arranged to receive the multiple data streams from the multiple source router output wireless communication links and to wirelessly transmit the multiple data streams over the destination routers input wireless links.

12. The data distribution system according to claim 11 wherein the group of intermediate routers comprises a first layer of intermediate routers that is arranged to receive the multiple data streams from the multiple source router output wireless communication links and a last layer of intermediate routers that is arranged to wirelessly transmit the multiple data streams over the destination routers input wireless links; wherein the first and last layers of intermediate routers are wirelessly coupled to each other.

13. The data distribution system according to claim 12 wherein the group of intermediate routers further comprises an intermediate layer of intermediate routers wirelessly coupled between the first and last layers of intermediate routers.

14. The data distribution system according to claim 1 wherein the gateway is arranged to evaluate wireless path parameters of various wireless paths formed between the source router and the destination routers.

15. The data distribution system according to claim 1 wherein the source router is arranged to add metadata relating to wireless path parameters of various wireless paths formed between the source router and the destination routers.

16. The data distribution system according to claim 1 wherein the multiple data streams comprise multiple Ethernet frames.

17. A method for data distribution, the method comprises: receiving, by a source router, multiple data streams; wirelessly transmitting the multiple data streams over multiple source router output wireless communication links towards destination routers; wirelessly receiving, by the destination routers, the multiple data streams over destination routers input wireless links;
wherein the receiving comprises receiving at least a fragment of a given data stream by a given destination routers of the destination routers; transmitting, by the destination routers, the multiple data streams to the gateway; wherein the transmitting comprising sending by the given destination router the at least fragment of the given data stream, directly or via one or more other destination routers, to the gateway; and reconstructing, by the gateway, the multiple data streams; and
outputting, by the gateway, the multiple data streams over one or more gateway output links.

18. The method according to claim 17 wirelessly transmitting by the source router different data streams over different source router output wireless communication links.

19. The method according to claim 17 wirelessly transmitting by the source router different fragments of a data stream of the multiple data streams over different source router output wireless communication links; and reconstructing by a gateway the data stream from the fragments of the data stream.

20. The method according to claim 19 comprising detecting by the gateway missing fragments of the data stream requesting a re-transmission of at least the missing fragments of the data stream.

21. The method according to claim 19 wherein the fragments of the data stream are fragments of frames of the data streams.

22. The method according to claim 21 further comprising receiving the fragments of frames of the data stream by a group of intermediate routers and wirelessly transmitting the fragments of the frames of the data streams to the destination routers without reconstructing the frames of the data stream by the group of intermediate routers.

23. The method according to claim 17 wherein the source router output wireless communication links are wireless local area network (WLAN) links.

24. The method according to claim 17 wherein the source router output wireless communication links are point to point wireless links.

25. The method according to claim 17 wherein the transmitting of the multiple data streams to the gateway is executed over wired destination routers links coupled between the destination routers and the gateway.

26. The method according to claim 17 wherein the destination routers and the gateway are coupled to each other to form a communication ring.

27. The method according to claim 17 further comprising receiving, by a group of intermediate routers, the multiple data streams from the multiple source router output wireless communication links; and wirelessly transmitting, by the group of intermediate routers, the multiple data streams over the destination routers input wireless links.

28. The method according to claim 27 wherein the group of intermediate routers comprises a first layer of intermediate routers and a last layer of intermediate routers, wherein the method comprises wirelessly receiving by the first layer of intermediate routers the multiple data streams from the multiple source router output wireless communication links and wirelessly transmitting, by the last layer of intermediate routers, the multiple data streams over the destination routers input wireless links; wherein the first and layers of intermediate routers are wirelessly coupled to each other.

29. The method according to claim 28 further comprising wirelessly receiving from the first layer of intermediate routers and by an intermediate layer of intermediate routers, the multiple data streams and wirelessly transmitting the multiple data streams from the intermediate layer of intermediate routers and to the destination routers the multiple data streams.

30. The method according to claim 17 comprising evaluating by the gateway wireless path parameters of various wireless paths formed between the source router and the destination routers.

31. The method according to claim 17 comprising adding by the source router metadata relating to wireless path parameters of various wireless paths formed between the source router and the destination routers.

32. The method according to claim 17 wherein the multiple data streams comprise multiple Ethernet frames.

* * * * *